United States Patent
Vendrow et al.

(10) Patent No.: US 9,614,795 B2
(45) Date of Patent: *Apr. 4, 2017

(54) PERSISTENT FORMAT CONVERSIONS

(71) Applicant: RingCentral, Inc., Belmont, CA (US)

(72) Inventors: Vlad Vendrow, Redwood Shores, CA (US); Vlad Shmunis, South Lake Tahoe, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,933

(22) Filed: Nov. 16, 2015

(65) Prior Publication Data
US 2016/0072742 A1 Mar. 10, 2016

Related U.S. Application Data

(63) Continuation of application No. 13/786,836, filed on Mar. 6, 2013, now Pat. No. 9,219,772.

(51) Int. Cl.
*G06F 15/16* (2006.01)
*H04L 12/58* (2006.01)
(Continued)

(52) U.S. Cl.
CPC ........ *H04L 51/066* (2013.01); *H04L 65/1006* (2013.01); *H04L 65/601* (2013.01);
(Continued)

(58) Field of Classification Search
CPC .......................... H04L 65/1006; H04L 67/306
(Continued)

(56) References Cited

U.S. PATENT DOCUMENTS

2009/0054032 A1 2/2009 Ren et al.
2009/0259676 A1 10/2009 Yamada et al.
(Continued)

FOREIGN PATENT DOCUMENTS

JP 2008-502233 1/2008
WO WO 2012/106126 8/2012

OTHER PUBLICATIONS

Authorized officer Seong Woo Kim, International Search Report and Written Opinion in PCT/US2014/021131, mailed Aug. 11, 2014, 10 pages.

*Primary Examiner* — Adnan Mirza
(74) *Attorney, Agent, or Firm* — Fish & Richardson P.C.

(57) ABSTRACT

Methods, systems, and apparatus, including computer programs encoded on a computer-readable storage medium for persistent format conversions. One of the methods includes receiving an original communication to be routed from a first user to a second user, wherein the original communication is received in a first format; converting, based a format conversion rule, the original communication into a second, different format; routing the original communication to the recipient in the second format; receiving a response communication related to the original communication and to be routed from the second user to the first user; and based on determining that the response communication is responsive to the original communication, converting the response communication into the first format prior to routing the communication to the first user.

20 Claims, 4 Drawing Sheets

(51) Int. Cl.
  *H04L 29/06* (2006.01)
  *H04L 29/08* (2006.01)
  *H04W 4/18* (2009.01)
(52) U.S. Cl.
  CPC ............ *H04L 67/306* (2013.01); *H04L 69/08* (2013.01); *H04W 4/18* (2013.01); *H04L 51/16* (2013.01)
(58) Field of Classification Search
  USPC .................................................. 709/245, 246
  See application file for complete search history.

(56) References Cited

U.S. PATENT DOCUMENTS

| | | | |
|---|---|---|---|
| 2011/0130168 A1* | 6/2011 | Vendrow | H04M 1/57 455/556.1 |
| 2014/0258559 A1 | 9/2014 | Vendrow et al. | |

* cited by examiner

PERSISTENT FORMAT CONVERSIONS

CROSS-REFERENCE TO RELATED APPLICATION

This is a continuation of U.S. application Ser. No. 13/786,836, filed on Mar. 6, 2013, the disclosure of which is considered part of and is incorporated by reference in the disclosure of this application.

BACKGROUND

This specification relates to managing communications for devices.

Advances in wireless networking and messaging technologies have given users the option of receiving and sending communications in many different formats. In some circumstances, however, a recipient of a communication may prefer to receive and respond to the communication in a format that is different from the one in which the communication was sent.

SUMMARY

In general, one innovative aspect of the subject matter described in this specification can be implemented in methods that include receiving an original communication to be routed from a first user to a second user, wherein the original communication is received in a first format; converting, based a format conversion rule, the original communication into a second, different format; routing the original communication to the recipient in the second format; receiving a response communication related to the original communication and to be routed from the second user to the first user; and based on determining that the response communication is responsive to the original communication, converting the response communication into the first format prior to routing the communication to the first user.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The response communication can be received in the second format. The response communication is received in a third, different format. The method can further include accessing a user profile of the second user to select the format conversion rule, wherein the format conversion rule identifies format preferences of the second user for received communications. The method can further include requesting access to an external format conversion rule from an external communication service provider, wherein the external format conversion rule identifies format preferences of the second user for communications received from other communication service providers; and converting the original communication into the second, different format based on the external format conversion rule.

The method can further include storing data identifying the original communication and one or more of the first user, the second user, or the rule for the conversion from the first format to the second format. The method can further include accessing the stored data to determine that the original communication was received from the first user in the first format.

Determining that the response communication is responsive to the original communication can include determining that the response communication is intended for the first user and is received within a pre-determined time window of the original communication.

Converting the original communication into the second, different format can include inserting an identifier into the original communication, the identifier being associated with data identifying the first format. The method can further include determining that the response communication includes the identifier; and determining that the response communication is responsive to a communication received in the first format based on the identifier.

Particular implementations may realize none, one, or more of the following advantages. Communications that are responsive to earlier communications can automatically be converted into the format of the earlier communication, improving the user experience when two users that prefer to receive communications in different formats exchange communications. Users of devices that cannot handle a particular communication format, e.g., users of mobile devices that cannot receive faxes, can communicate more effectively with other users who prefer to communicate using the particular communication format. Users of devices can respond more rapidly to communications by responding using the same application and/or device by which they received the communications, which may then be converted back to the preferred format of the sender.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An original communication received at a communication service provider system can be converted into a different format, e.g., into a format identified by a format conversion rule, before being routed to a recipient. When a later communication is received at the communication service provider system, a determination can be made that the later communication is responsive to the original communication, and the later communication can be converted into the format in which the original communication was received.

Figure 1:
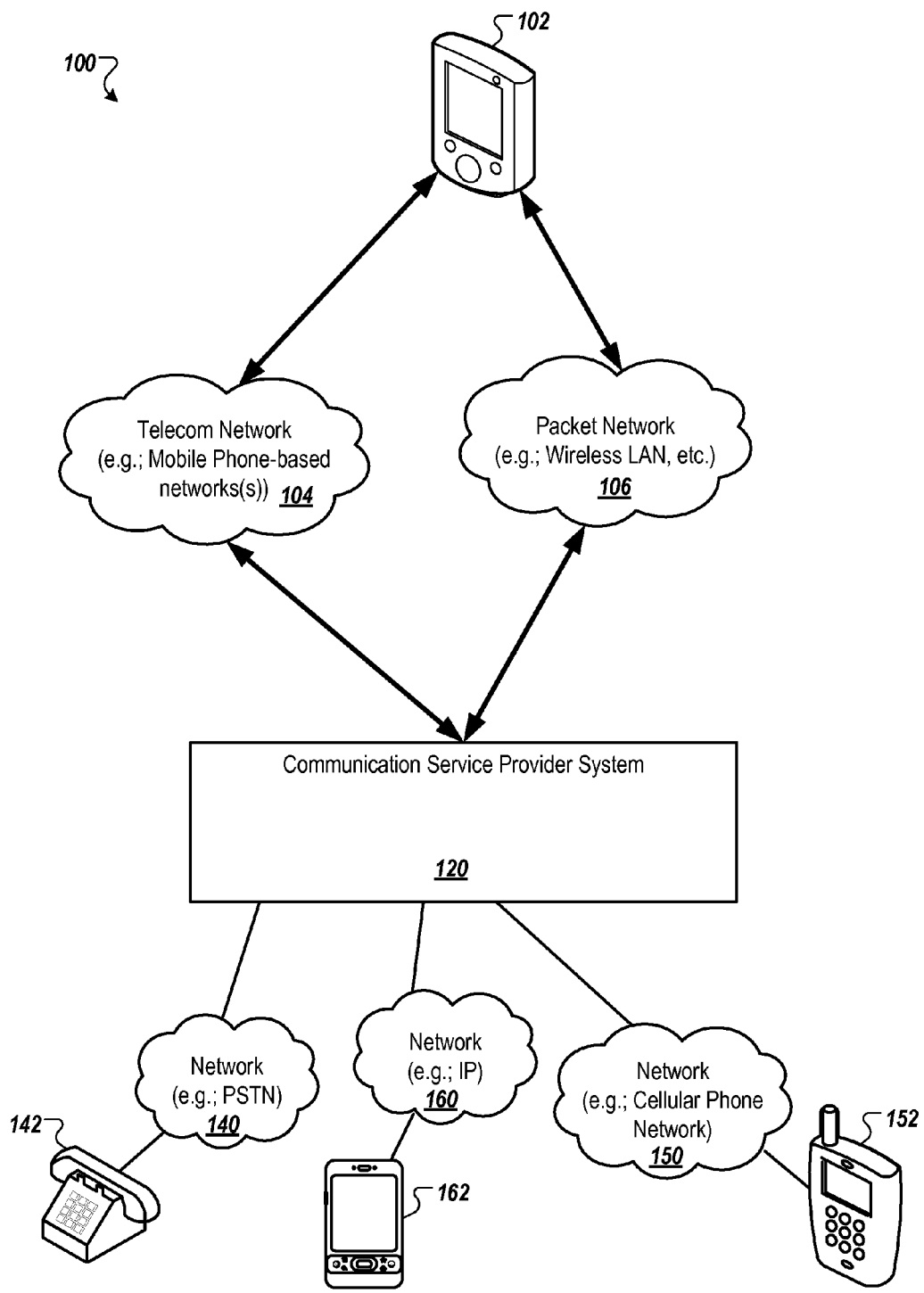
FIG. 1 is a diagram of an example communication system.

FIG. 1 is a diagram of an example communication system 100. As shown in FIG. 1, a communication service provider system 120 provides communication services to users, e.g., a user of a user device 102. The user device 102 can be e.g., a data processing apparatus such as a personal computer, a portable computer, a smart phone, or a tablet computer. The communication services can include any telecommunications services, short message services (SMS), e-mail services, fax services, instant messaging services, or other services for communicating information between users, each of which can be offered through a respective communication portal, e.g., an e-mail portal, an instant messaging portal, a fax portal, or other portal. For example, the communication service provider system can be a virtual private branch exchange (vPBX) service provider that provides various vPBX services through various communication portals to the user of the user device 102.

As part of providing the communication services, the communication service provider system 120 can route communications to and from the user device 102 over one or more networks, e.g., over one or more of networks 104 and 106. The network 104 can operate in accordance with a first mode of communication. Examples of the first mode of communication include those associated with Public Switched Telephone Network ("PSTN") phone technologies, cellular/wireless telephone technologies (e.g., Global System for Mobile communications ("GSM"), Frequency Division Multiple Access ("FDMA"), Time Division Multiple Access ("TDMA"), or Code Division Multiple Access ("CDMA")), and other communication protocols such as the Session Initiation Protocol. The network 106 can operate in accordance with a second mode of communication. Examples of the second mode of communication can include VOIP phone technologies, wireless LAN technologies (e.g., telephone technologies/standards, such as WiMAX and any other IEEE 802.xx-based technologies/standards), or other technologies. Any number of modes is possible.

The communication service provider system 120 can be configured to route communications to the user device 102 in any of a number of formats associated with communication services provided by the communication service provider system 120. For example, the communication service provider system 120 can perform call control operations in association with a voice call from a phone 142 through a voice portal via a network 140 and/or a SMS communication from a mobile device 152 through an SMS portal via a network 150 and/or an e-mail communication through an e-mail portal from a user device 162 via a network 160. The communications to be routed to or from the user device 102 can originate from or be destined for other users of the communication service provider system 120 or external users of external communication service providers.

The communication services provided by the communication service provider system 120 enable the user of the user device 102 to communicate in a variety of communication formats. In some implementations, the communication service provider 120 may convert a communication intended for or sent by the user of the user device 102 into a different format before routing the communication to the recipient. Generally, a format conversion is a conversion from a format used by one communication method, e.g., fax, to a format used by another communication method, e.g., SMS or e-mail.

Figure 2:
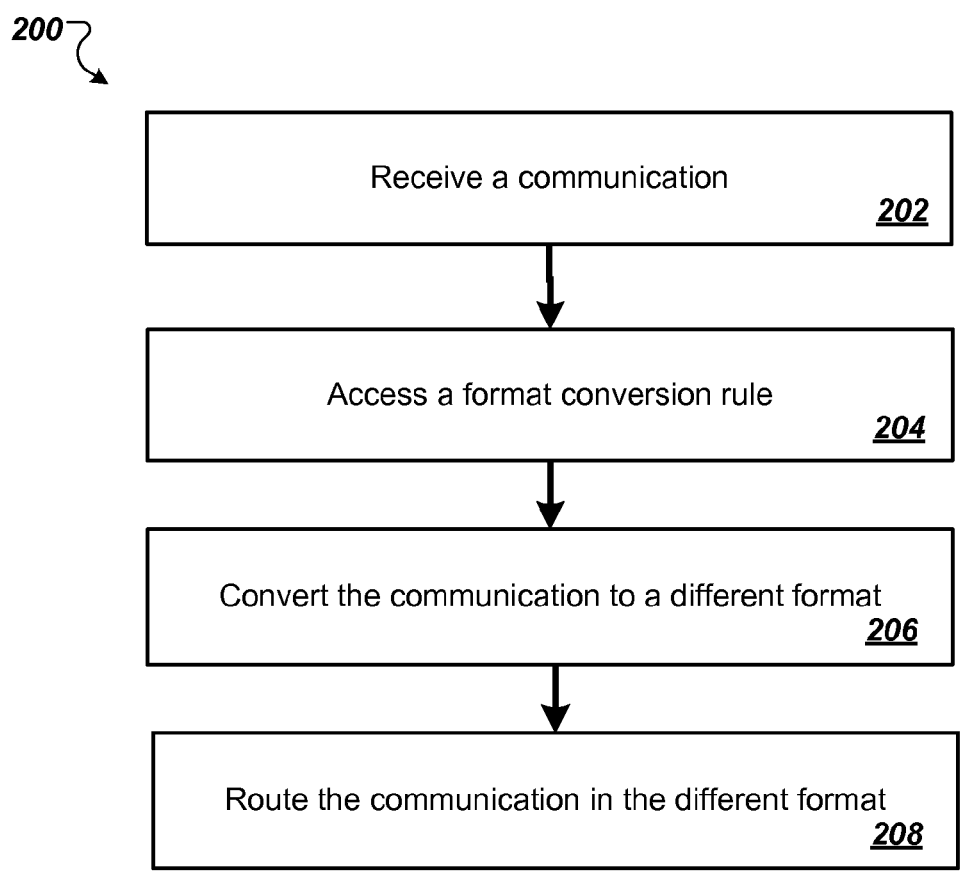
FIG. 2 is a flowchart of an example process for converting the format of an original communication.

FIG. 2 is a flowchart of an example process 200 for converting the format of an original communication. The process 200 can be performed by a computer system including one or more computers, such as, for example, the communication service provider system 120, as shown in FIG. 1.

A communication to be routed to a recipient is received (202). The communication is received in an original format and can be an internal communication or an external communication. An internal communication is a communication that is sent from a user of a communication service provider system and intended for another user of the communication service provider system. An external communication is a communication that is either sent by or intended for a user of an external communication service provider, i.e., a different communication service provider than the communication service provider at which the communication is received.

An appropriate format conversion rule is selected for the received communication (204). In some implementations, a format conversion rule specifies a destination format and format conversion criteria for converting a communication into the destination format. The criteria can be based on characteristics of the received message, sender preferences and/or recipient preferences.

In some implementations, a user profile of the recipient can be accessed that defines the recipient's preferences for received communications and an appropriate rule can be selected, e.g., a rule for which the format conversion criteria are met, from the rules specified in the profile. If the recipient is a user of an external communication service provider, a request to access the user profile of the recipient can be transmitted to the external communication service provider. Alternatively, a default format can be selected for recipients associated with external communication service providers.

A format conversion rule can identify, for each of a number of formats, one or more specific applications that can process the original format. A check can be made to determine which applications are available/running on the recipient device. When no applications are available to process the original format on the recipient device, the communication can be converted into an alternative (e.g., default) format. For example, when the communication is an instant messaging communication, a rule can specify that, when an instant messaging application is not running on the recipient device, the instant messaging communication should be converted into an alternative format, e.g., an SMS format or an e-mail format.

A format conversion rule can also identify particular times during which communications should be delivered in particular formats. For example, a rule can specify that during business hours, the communication should be converted (if necessary) and delivered to the user via fax, and after business hours, the communication should be converted (if necessary) and delivered to the user via e-mail.

The communication is converted as appropriate based at least in part on the selected format conversion rule (206). The communication can be converted into the different format using conventional format conversion techniques. For example, a voice mail message can be converted into a SMS message or an e-mail using conventional speech to text, i.e., automatic speech recognition, conversion techniques. As another example, an e-mail can be converted to a voice call or voicemail using conventional text to speech conversion techniques. As yet another example, an e-mail can be converted to a text message by prepending the subject line of the e-mail to the body of the e-mail and sending the entire text as a text message.

Identifying information for use in determining that future communications are responsive to the received communication is generated (208). In some implementations, thread data can be generated that identifies the sender of the communication, the recipient of the communication, and the original format of the communication. Thread data can also include the time in which the communication is sent (e.g., based on network time), attributes of the communication itself, such as the subject matter of the communication (e.g., based on conventional natural language processing techniques, such as text classification or summarization), or attributes of the sender or recipient of the communication, such as the organization he or she belongs to (e.g., based on conventional directory information, social media information or other Internet sources).

In some implementations, the identifying information can be appended or prepended to the converted communication, or the converted communication can be otherwise modified to include the identifying information. For example, a temporary address can be associated with the thread data and the envelope information of the converted communication can be modified to indicate that a response to the communication should be addressed to the temporary address, e.g., by changing a "reply-to" or a "from" address identified in the envelope information of the converted communication to the temporary address.

As another example, an identifier that identifies the original format of the communication can be inserted into the contents of the converted communication. For example, an identifier can be inserted into the body of the communication using a pre-determined syntax. When a future communication is received that includes the pre-determined syntax, the syntax can be parsed to identify the format identified by the identifier. For example, an identification number unique to the thread of communication may be generated and inserted into the envelope information of the communication or into the body of the communication, e.g., in accordance with a "THREAD ID:<NUMBER>" format. Depending on the communication format and on the client application used to process the communication, the client application may parse the identification number from the communication and may or may not display the identification number to the user based on default settings or specified user preferences. Upon a response to the communication from the user, the client application may send the response with the identification number, either by inserting the identification number in the response or passing it separately to the system.

The communication is thereafter routed to the recipient in the different format (208). When the recipient of the communication is a user of an external communication service provider, the communication can be forwarded to the external communication service provider for delivery to the recipient.

Figure 3:
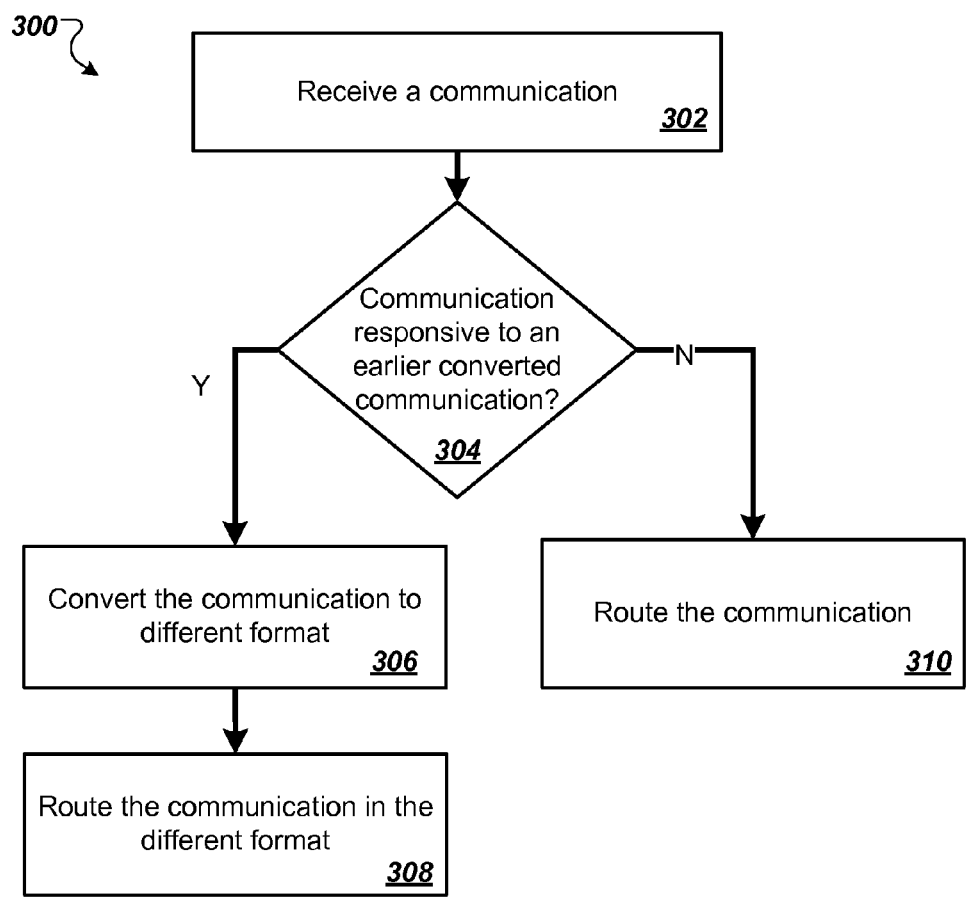
FIG. 3 is a flowchart of an example process for routing a communication that is responsive to an original communication.

FIG. 3 is a flowchart of an example process 300 for routing a communication that is responsive to an original communication. The process 300 can be performed by a computer system including one or more computers, such as, for example, the communication service provider system 120, as shown in FIG. 1.

A communication is received (302). As described above, the communication can be either an internal communication or an external communication.

A determination is made whether the communication is responsive to an earlier communication that has been converted from an original format (304). The determination can be made in any of a variety of ways.

For example, in implementations where identifying information is added to a converted communication by modifying the envelope information of the converted communication, the determination can be made based on whether or not the communication is addressed to a temporary address that has previously been associated with an originating address and an original format. If the communication is addressed to such a temporary address, it can be determined that the communication is responsive to a communication received from the originating address in the original format.

As another example, in implementations where identifying information is inserted into the contents of a converted communication, the determination can be made based on whether or not the contents of the communication include a pre-determined syntax that can be parsed to reveal an identifier that has previously been associated with an original format. If the communication includes such an identifier, it can be determined that the communication is responsive to a communication received in the original format.

As another example, a determination can be made based on whether or not the communication is part of a thread identified by thread data. A match can be located by evaluating various information for the thread. For example, it can be determined whether the recipient and the sender match the sender and the recipient identified by thread data. Optionally, in order for a match to be found, it can also be required that the communication is in the same format as the format to which the earlier communication was converted. Further optionally, in order for a match to be found, it can also be required that the communication be received within a pre-determined time window of the earlier communication. As another example, a match may be found based at least in part on attributes of the communication itself, e.g., the subject matter of the communication as determined using conventional text classification techniques.

If the communication is responsive to an earlier communication that has been converted from an original format, the communication is converted into the original format (306) and routed in the different format (308).

If the communication is not responsive to any earlier communication (i.e., no match is located), the communication can be routed (310), e.g., without a conversion or as an original communication as described above with reference to FIG. 2.

Figure 4:
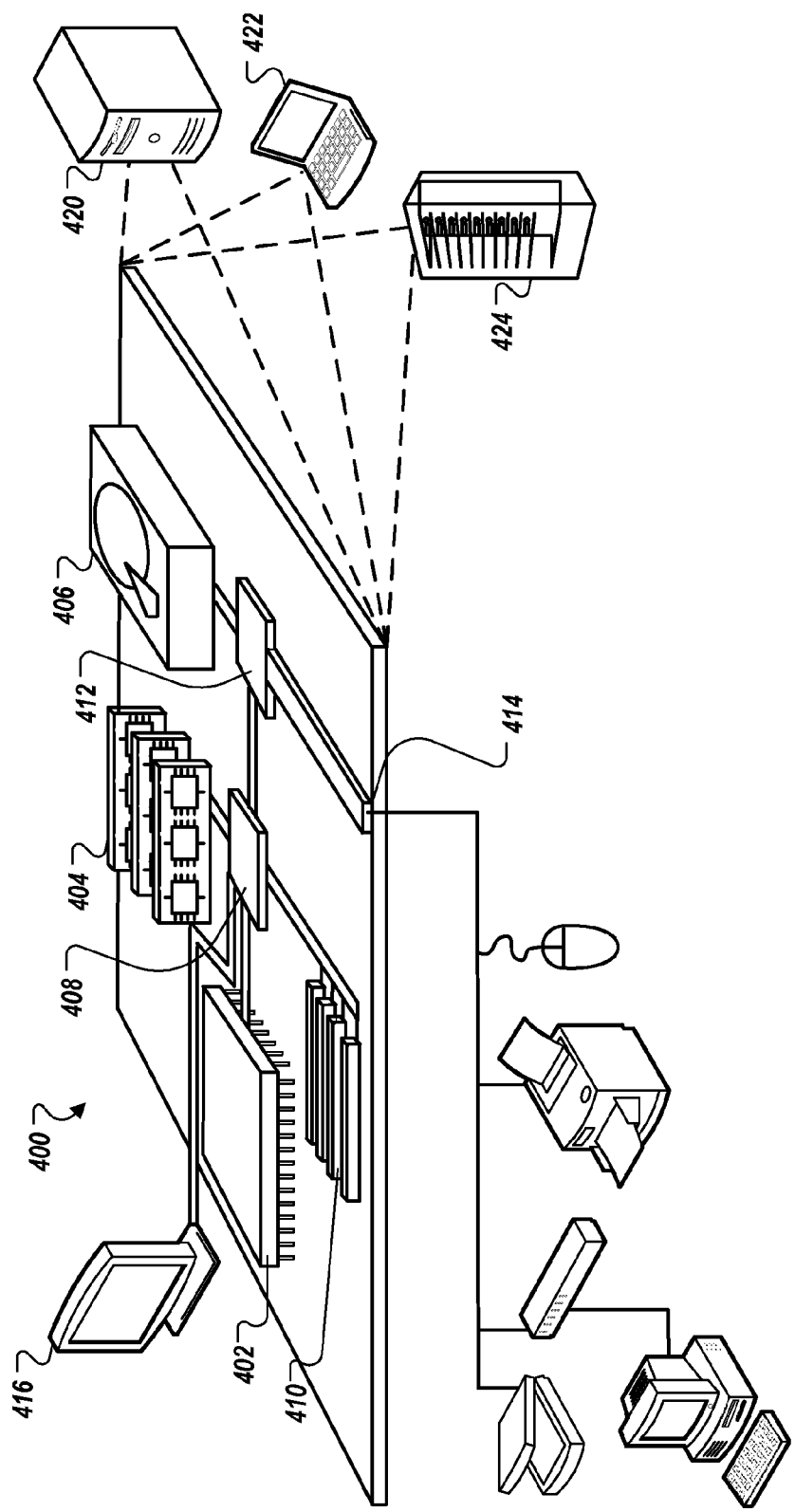
FIG. 4 is a block diagram of an example computing device.

FIG. 4 is a block diagram of an example computing device 400 that may be used to implement the systems and methods described in this document. Computing device 400 can represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

As shown in FIG. 4, computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Each of such devices may contain one or more of computing device 400 and an entire system may be made up of multiple computing devices 400 communicating with each other.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The features described can be implemented in digital electronic circuitry, or in computer hardware, firmware, software, or in combinations of them. In some implementations, the apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. In other implementations, the apparatus can be implemented in a computer program product tangibly embodied in an information carrier for execution by a programmable processor. In some implementations, the information carrier can include a propagated signal.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what can be claimed, but rather as descriptions of features that can be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations.

A number of embodiments of the invention have been described. Nevertheless, it will be understood that various modifications can be made without departing from the spirit and scope of the invention. Accordingly, other embodiments are within the scope of the following claims.

What is claimed is:

1. A method comprising:
   receiving a current communication in a current format, the current communication relating to an original communication that was routed in a different format;
   determining that the original communication was converted from an original format to the different format prior to being routed in the different format; and
   converting the current communication from the current format into the original format prior to routing the current communication to a recipient based on determining that the original communication was converted from the original format to the different format prior to being routed.

2. The method of claim 1, further comprising:
   receiving the original communication for routing from the recipient to a different user;
   converting, based a format conversion rule, the original communication into the different format;
   associating identifying information with the original communication; and
   routing the original communication to the different user in the different format.

3. The method of claim 2, further comprising:
   accessing a user profile of the different user to select the format conversion rule, wherein the format conversion rule identifies format preferences of the different user for received communications.

4. The method of claim 2, further comprising:
   requesting access to an external format conversion rule from an external communication service provider, wherein the external format conversion rule identifies format preferences of the different user for communications received from other communication service providers; and
   converting the original communication into the different format based on the external format conversion rule.

5. The method of claim 2, further comprising:
   determining that the current communication is associated with the identifying information associated with the original communication; and
   converting the current communication into the original format based at least in part on determining that the current communication is associated with the identifying information associated with the original communication.

6. The method of claim 5, wherein associating the identifying information with the original communication comprises:
   inserting an identifier into the original communication, the identifier being associated with data identifying the original format.

7. The method of claim 6, wherein determining that the current communication is associated with the identifying information comprises:
   determining that the current communication includes the identifier that was inserted into the original communication.

8. The method of claim 7, wherein inserting the identifier into the original communication comprises inserting the identifier using a pre-determined syntax, and wherein determining that the current communication includes the identifier comprises:
   determining that the current communication includes the pre-determined syntax; and
   parsing the pre-determined syntax to identify the identifier.

9. The method of claim 1, further comprising:
determining that the current communication is addressed to a temporary address that is associated with data indicating that the current communication is responsive to the original communication; and
converting the current communication into the original format based at least in part on determining that the current communication is addressed to the temporary address.

10. A system comprising:
a communication service provider system that provides communication services to users of the communication service provider system, wherein the communication service provider system comprises one or more computers and one or more storage devices storing instructions that when executed by the one or more computers cause the one or more computers to perform operations comprising:
receiving a current communication in a current format, the current communication relating to an original communication that was routed in a different format;
determining that the original communication was converted from an original format to the different format prior to being routed in the different format; and
converting the communication from the current format into the original format prior to routing the communication to a recipient based on determining that the original communication was converted from the original format to the different format prior to being routed.

11. The system of claim 10, the operations further comprising:
receiving the original communication for routing from the recipient to a different user;
converting, based a format conversion rule, the original communication into the different format;
associating identifying information with the original communication; and
routing the original communication to the different user in the different format.

12. The system of claim 11, the operations further comprising:
accessing a user profile of the different user to select the format conversion rule, wherein the format conversion rule identifies format preferences of the different user for received communications.

13. The system of claim 11, the operations further comprising:
requesting access to an external format conversion rule from an external communication service provider, wherein the external format conversion rule identifies format preferences of the different user for communications received from other communication service providers; and
converting the original communication into the different format based on the external format conversion rule.

14. The system of claim 11, the operations further comprising:
determining that the current communication is associated with the identifying information associated with the original communication; and
converting the current communication into the original format based at least in part on determining that the current communication is associated with the identifying information associated with the original communication.

15. The system of claim 14, wherein associating the identifying information with the original communication comprises:
inserting an identifier into the original communication, the identifier being associated with data identifying the original format.

16. The system of claim 15, wherein determining that the current communication is associated with the identifying information comprises:
determining that the current communication includes the identifier that was inserted into the original communication.

17. The system of claim 16, wherein inserting the identifier into the original communication comprises inserting the identifier using a pre-determined syntax, and wherein determining that the current communication includes the identifier comprises:
determining that the current communication includes the pre-determined syntax; and
parsing the pre-determined syntax to identify the identifier.

18. The system of claim 10, the operations further comprising:
determining that the current communication is addressed to a temporary address that is associated with data indicating that the current communication is responsive to the original communication; and
converting the current communication into the original format based at least in part on determining that the current communication is addressed to the temporary address.

19. A computer program product encoded on one or more non-transitory computer storage media, the computer program product comprising instructions that when executed by one or more computers cause the one or more computers to perform operations comprising:
receiving a current communication in a current format, the current communication relating to an original communication that was routed in a different format;
determining that the original communication was converted from an original format to the different format prior to being routed in the different format; and
converting the communication from the current format into the original format prior to routing the communication to a recipient based on determining that the original communication was converted from the original format to the different format prior to being routed.

20. The computer program product of claim 19, the operations further comprising:
receiving the original communication for routing from the recipient to a different user;
converting, based a format conversion rule, the original communication into the different format;
associating identifying information with the original communication; and
routing the original communication to the different user in the different format.

* * * * *